(No Model.)

H. A. ROOKE.
ROLLER BEARING FOR PULLEY BLOCKS.

No. 407,693. Patented July 23, 1889.

Witnesses
Wm M Stockbridge
Wm A Rosenbaum

Inventor
Henry A. Rooke
by V. D. Stockbridge
Atty.

UNITED STATES PATENT OFFICE.

HENRY ALFRED ROOKE, OF LIVERPOOL, COUNTY OF LANCASTER, ENGLAND.

ROLLER-BEARING FOR PULLEY-BLOCKS.

SPECIFICATION forming part of Letters Patent No. 407,693, dated July 23, 1889.

Application filed September 18, 1888. Serial No. 285,694. (No model.) Patented in England December 6, 1887, No. 16,803.

*To all whom it may concern:*

Be it known that I, HENRY ALFRED ROOKE, block and spar maker, a subject of the Queen of Great Britain, residing at Liverpool, in the county of Lancaster, in the Kingdom of England, have invented certain new and useful Improvements in Roller-Bearings for Pulley-Blocks, (for which I have received Letters Patent in England, No. 16,803, dated December 6, 1887,) of which the following is a specification.

This invention relates to improvements in roller-bearings for pulley-blocks, and other like purposes.

In roller-bearings hitherto employed for pulley-blocks the rollers have frequently been pivoted to two in parallel concentric rings, which were riveted together in such a manner that it was difficult to detach them without injury to the parts when it was necessary to renew or repair the rollers. In other forms of roller-bearings the rollers have been held between shoulders or within annular recesses in the body or frame of the block, the two parts of the said frame being so riveted together as to render it difficult to separate them without special tools and also without injury to the sheave or to the body of the block; also, in most roller-bearings hitherto constructed for pulley-blocks the rollers have run in direct contact with the central block-pin, which was usually of rough unturned metal, and consequently caused the rollers to wear rapidly.

Now, the objects of my improvements are to obviate the above defects by constructing a simple and durable roller-bearing, which can readily be inserted into or removed from the block without injury thereto, the parts of which can be easily and quickly assembled or dismounted and the rollers of which shall have a smooth and true axle to run upon.

I carry out my invention in the following manner, reference being had to the drawings which form part of this specification.

Figure 1:
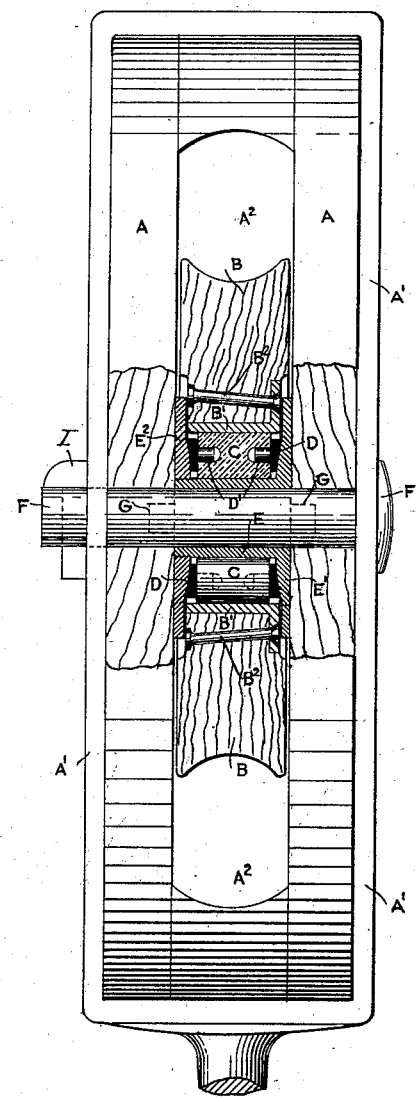
Figure 2:
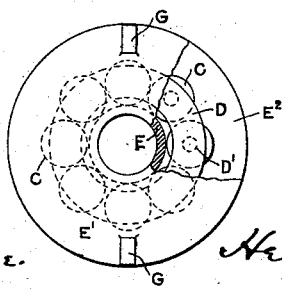

In the drawings, Figure 1 is a side elevation, partly in section, of a block provided with bearings constructed according to this invention. Fig. 2 is an end view of the bearings detached, a portion of the outside flange G' being broken away.

A A are the cheeks of the wooden block, which is strengthened and hung by means of a rope or metal strap A'.

$A^2$ is the opening between the cheeks, within which the pulley B revolves on its bearings. The bearing-rollers C may be of any convenient size and number. They are supported at each end by an annular plate or ring D, having on its inner face a number of equidistant circular pins or studs D', which enter into holes in the ends of the rollers and allow the free revolution of same; or, if desired, the end faces of the rollers could be provided with pins fitting into holes in the plate D, or the rollers could run in annular recesses in the flanges $E'$ $E^2$, hereinafter described. The outer face of each ring is recessed or dished, as shown, so that it has always a tendency to arrange itself centrally as regards the axis of the bearings.

Instead of uniting the plates or rings D by means of rivets, as heretofore, they are held in position against the ends of rollers C by means of two annular flanges $E'$ $E^2$, which are adjustable as regards their distance apart, and are held stationary within the block, as hereinafter described. One of the flanges $E'$ is preferably fixed rigidly to one end of a sleeve E, and the other flange $E^2$ is screwed or otherwise made adjustable upon the opposite end of the sleeve. Said flanges are preferably of a larger diameter than ring D, and serve also to prevent friction (due to side play) between the sides of the pulley B and the cheeks A. The sleeve E and flanges $E'$ $E^2$ thus form a casing for the rollers C and rings D. The inner faces of the flanges $E'$ $E^2$ fit the recesses or concavities in plates D, and when screwed or tightened up hold said plates centrally against the ends of the rollers C, but not so tightly as to prevent the rollers and rings from revolving. The outer surface of the sleeve E is turned up with little additional labor at the same time that the flange E' is faced, and forms a true axle for the rollers C, which would in ordinary cases run upon the rough central pin F, as the centering and turning of the latter would involve a much greater expenditure of time and labor.

The sleeve E can be mounted on the ordinary central sheave-pin F, which is passed through the cheeks A. The pin can be riveted to the strap A'; but I prefer to secure it in a removable manner, as shown, by means of a split pin I or by a nut or other similar device; or the pin may simply rest in the straps and cheeks without any securing device; or the sleeve could have a shank at each end, which could be mounted in the cheeks A. The flanges E' E² are each provided on their outer faces with lugs G, which are engaged by corresponding grooves in the inner faces of the cheeks A and prevent the flanges and sleeve from turning. The grooves extend from the outer edge of the block to a point some distance beyond the center thereof, or even to the opposite edge of the block. Other devices for preventing the flanges and sleeve from turning might be employed—such as a pin or pins passed through the sides of the block into the flanges; but the latter plan is not so convenient.

The pulley B, if made of wood or other soft material, is lined with a metal bush B', the inside of which runs on the rollers C, the bush being attached to the pulley by means of rivets B², or in other suitable manner.

To repair or renew the rollers, the pin F is first removed. The pulley and bearings are then slid out of the block, the grooves in the inside of the latter permitting the free passage of the lugs G. The flange E² is then removed and free access can be had to the rings D and rollers C, which can be repaired or renewed, as desired, none of the above operations requiring special tools or skill or involving injury to the block or other parts.

I declare that what I claim is—

1. In roller-bearings for pulley-blocks, the combination of the rollers C, the retaining-rings D, having equidistant roller-bearing pins D' on their inner faces and having their outer faces annularly concaved, and the sleeve E, having flanges E' E² bearing against the concave faces of the rings D, said flange E² being separable and adjustable, whereby the rollers or rings as they become worn may be readily adjusted or removed, substantially as described.

2. In a pulley-block, the combination, with the cheeks A and central pin F, of a roller-bearing casing E E' E², supported between the cheeks upon said pin, and having lugs G, engaged by grooves formed in the inner faces of the cheeks and extended outward to the edge thereof, whereby the casing is prevented from turning within the block, but can readily be detached therefrom without injury to any part, substantially as described.

In testimony whereof I have signed my name to this specification in the presence of two subscribing witnesses.

HENRY ALFRED ROOKE.

Witnesses:
WM. P. THOMPSON,
JOSEPH I. ROYDEN.